US006245999B1

(12) United States Patent
Costigan et al.

(10) Patent No.: US 6,245,999 B1
(45) Date of Patent: Jun. 12, 2001

(54) CABLE ENCLOSURE ARRANGEMENT

(75) Inventors: Philip Costigan, Swindon (GB); Christopher Borrill, Christchurch (NZ); Philip Roland Winfield, Swindon; Jonathan Wakenshaw, Stourport-on-Severn, both of (GB)

(73) Assignee: Raychem Limited, Swindon (GB)

( * ) Notice: Subject to any disclaimer, the term of this patent is extended or adjusted under 35 U.S.C. 154(b) by 0 days.

(21) Appl. No.: 09/331,138

(22) PCT Filed: Dec. 11, 1997

(86) PCT No.: PCT/GB97/03422

§ 371 Date: Jun. 16, 1999

§ 102(e) Date: Jun. 16, 1999

(87) PCT Pub. No.: WO98/27632

PCT Pub. Date: Jun. 25, 1998

(30) Foreign Application Priority Data

Dec. 19, 1996 (GB) .................................................. 9626364
Jun. 13, 1997 (GB) .................................................. 9712324

(51) Int. Cl.[7] .................................................. H01B 7/24
(52) U.S. Cl. ........................................... 174/74 A; 174/93
(58) Field of Search ........................ 174/93, 73.1, 138 F, 174/DIG. 8, 74 A; 138/166

(56) References Cited

U.S. PATENT DOCUMENTS

| 3,161,210 | * | 12/1964 | Loof | 138/166 |
| 3,357,457 | * | 12/1967 | Myer | 138/166 |
| 3,515,798 | | 6/1970 | Sievert | 174/135 |
| 3,824,331 | | 7/1974 | Mixon, Jr. et al. | 174/135 |
| 4,016,356 | | 4/1977 | McLoughlin | 174/35 R |
| 4,029,895 | * | 6/1977 | Scarborough | 174/138 F |
| 4,070,746 | | 1/1978 | Evans et al. | 29/450 |
| 4,179,320 | | 12/1979 | Midgley et al. | 156/86 |
| 4,233,731 | | 11/1980 | Clabburn et al. | 29/859 |
| 4,410,009 | | 10/1983 | Blum | 138/109 |
| 4,462,651 | * | 7/1984 | McGaffigan | 174/DIG. 8 X |
| 4,506,430 | | 3/1985 | Guzay, Jr. | 29/450 |
| 4,559,973 | | 12/1985 | Hane et al. | 138/138 |
| 4,885,432 | * | 12/1989 | Amoyal et al. | 174/93 X |
| 5,365,020 | * | 11/1994 | Vallauri et al. | 174/73.1 |
| 5,661,842 | * | 8/1997 | Faust | 174/93 X |
| 5,753,861 | * | 5/1998 | Hasen et al. | 174/93 |
| 5,856,634 | | 1/1999 | Borgstrom | 174/135 |

FOREIGN PATENT DOCUMENTS

| 2107383 | 4/1994 | (CA) . | |
| 0530952 B1 | 3/1993 | (EP) | B29C/61/06 |
| 0750381 A1 | 12/1996 | (EP) | H02G/15/18 |
| 874872 | 8/1961 | (GB) . | |
| 2018527 | 10/1979 | (GB) | H02G/15/08 |
| 2061631 | 5/1981 | (GB) | H02G/15/00 |
| 58-179634 | 10/1983 | (JP) | B29H/7/00 |
| WO 89/00782 | 1/1989 | (WO) | H02G/15/00 |
| WO 91/16564 | 10/1991 | (WO) | F16L/11/00 |
| WO 95/11542 | 4/1995 | (WO) | H02G/15/18 |
| WO 96/07049 | 3/1996 | (WO) | F16F/47/00 |

* cited by examiner

Primary Examiner—Dean A. Reichard
Assistant Examiner—Chau N. Nguyen
(74) Attorney, Agent, or Firm—Myers Bigel Sibley & Sajovec

(57) ABSTRACT

An arrangement for enclosing an elongate substrate, e.g. a cable connection includes an outer resilient sleeve held in a radially-expanded configuration by being mounted on an inner holdout member, wherein the holdout member includes a generally tubular member that has a slit extending longitudinally thereof such that application of a force radially thereof causes the holdout member to reduce in circumference and to collapse around the substrate under the action of the recovery force of the outer resilient sleeve.

27 Claims, 8 Drawing Sheets

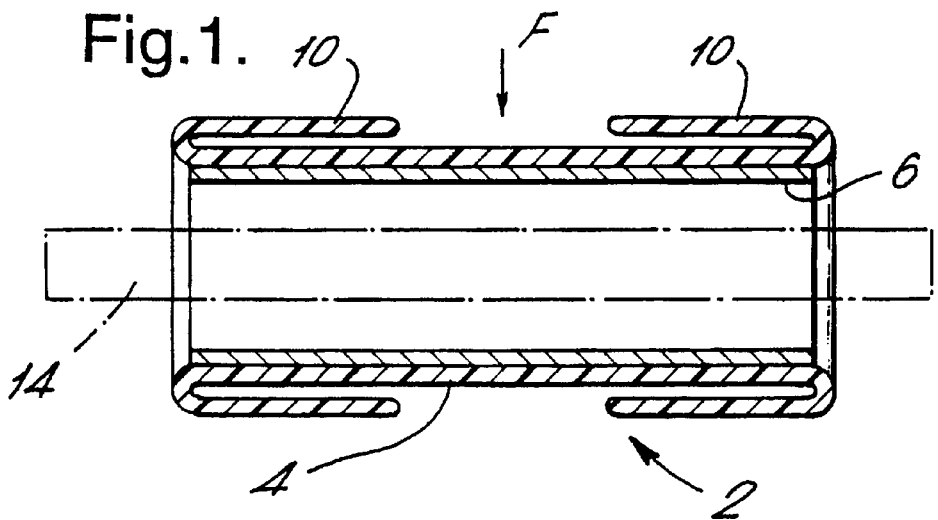
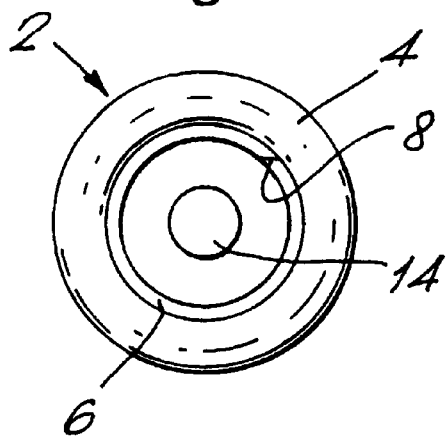
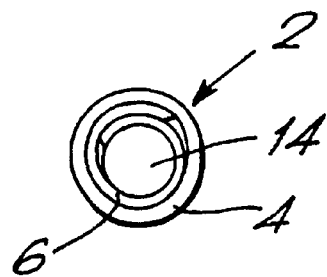
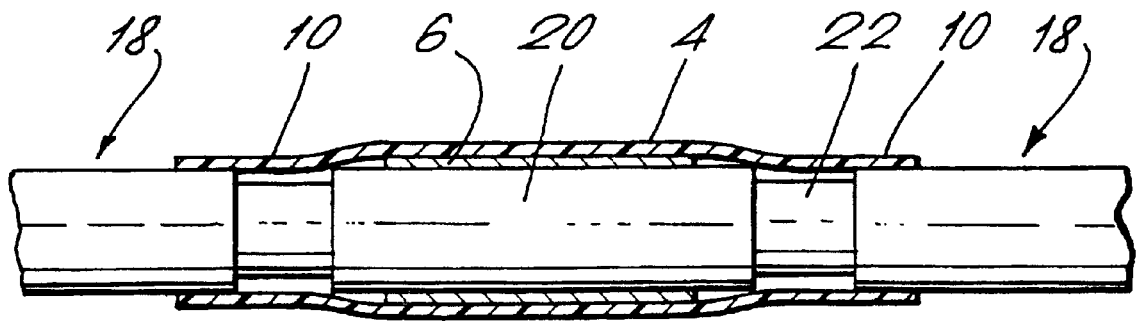

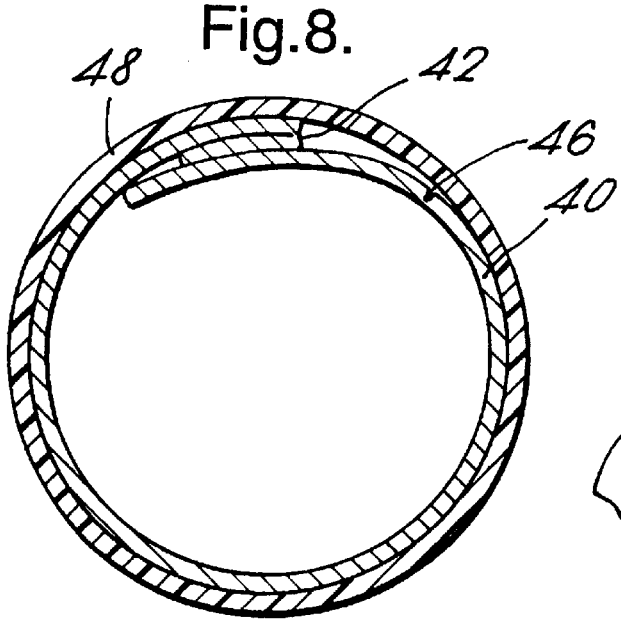
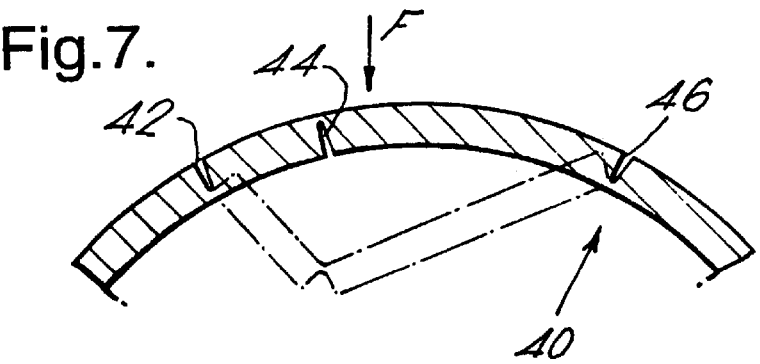
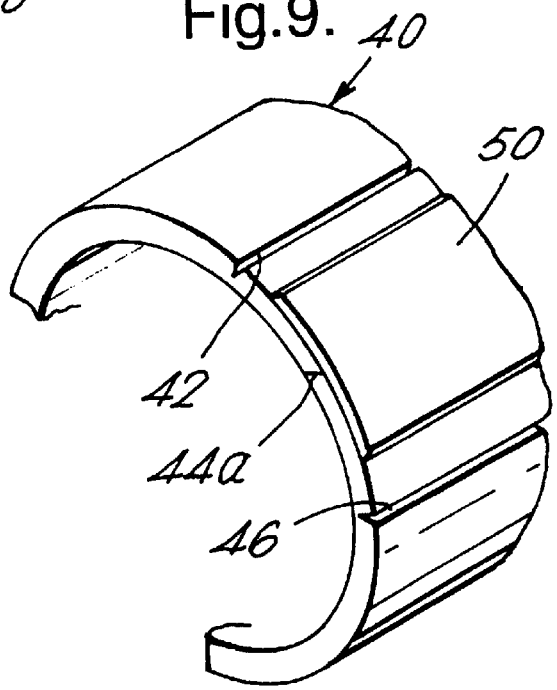
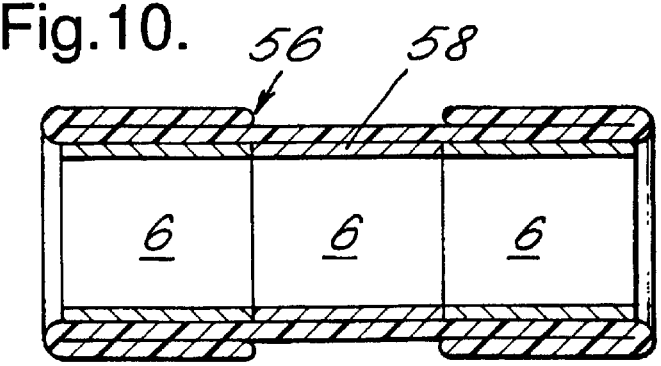

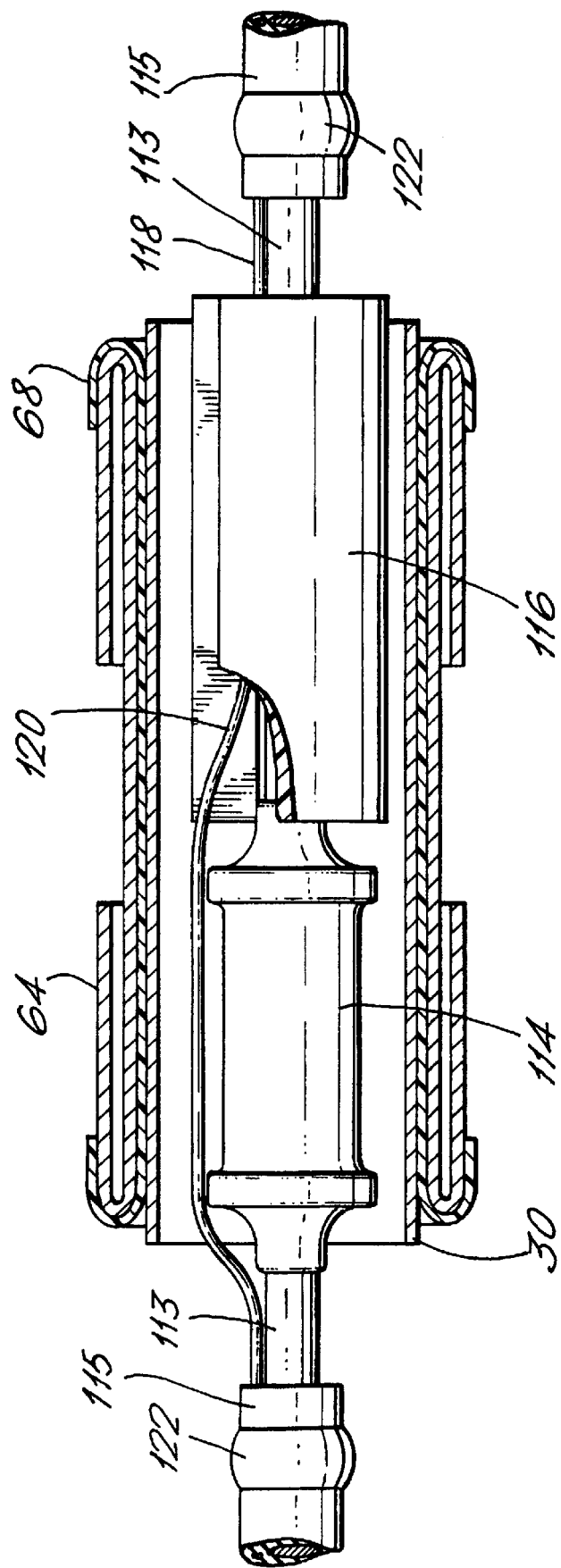

CABLE ENCLOSURE ARRANGEMENT

BACKGROUND OF THE INVENTION

This invention relates to an arrangement for and method of enclosing an elongate substrate. The substrate may comprise a cable, for example an electrical power or telecommunications cable, and in particular a cable connection. The cable connection may comprise a joint between two, or more, cables, or a termination of a cable, for example on to a terminating lug or bushing connected to electrical equipment such as switchgear or a transformer. The termination may comprise an adapter, for example an elbow.

The invention will be further particularly described with reference to an in-line joint between two electric power cables, but it is to be understood that this is by way of example only and not by way of limitation.

Joints between two power cables, whether either or both are polymeric or paper insulated cables, need to be enclosed within an outer protective arrangement that includes an electrically insulating layer. Heat shrink technology has been applied for this purpose for many years, with products available from Raychem and others. However, technologies that do not require heat are also employed. Push-on sleeves and elbows are available but unlike heat shrinkable products, these have severe range-taking limitations that necessitate a large inventory. Other so-called cold applied solutions require a tubular elastomeric sleeve to be radially expanded and mounted on a rigid holdout member, the internal diameter of which is larger than the maximum outer diameter of the cable joint to be enclosed. One example of the latter is the PST sleeve available from 3M, as exemplified in U.S. Pat. No. 3,515,798. Such a sleeve has an inner holdout member that consists of a continuous narrow strip of tough flexible material in the form of a rigid closed helix having adjacent coils interconnected. The held out sleeve is mounted over the cable joint and the helical strip is then unwound, thus allowing the insulating stretched elastic cover to shrink down onto the joint. However, it is inconvenient having to unwind the holdout strip helically around the extended cable, especially if the work has to be done in the confined space of a trench or manhole. Another example of a cold applied arrangement is disclosed in U.S. Pat. No. 3,824,331, in which a resilient tubular cover is supported in a stretched condition by an easily removable external one piece support member, each end of the cover being rolled back over the outside of the support. The cover and support member are mounted on an internal sleeve in the form of a longitudinally slit tube held in a state of increased diameter by a dividing strip in the shape of an I-beam. When in position over the cable joint, removal of the dividing strip longitudinally from the slit allows the inner tube to be squeezed and then freely withdrawn from the cover. The cover ends are then unrolled onto the adjacent cable sections and the external support member is removed. It will be appreciated that such an arrangement requires an inner and an outer holdout member, each of which has to be removed.

EP-B-0 530 952 discloses a cover assembly in which an elastomeric tube is held out in a stretched condition on an inner support core. The core is frangible such that application thereto of a force beyond that produced by the tube causes breakage of the core so as to allow contraction of the elastomeric tube onto the substrate. The fragments of the collapsed core remain within the tube and must therefore be as small as possible to facilitate accommodation therewithin.

It is an object of the present invention to provide an arrangement for and method of enclosing an elongate substrate that overcome disadvantages of the known arrangements, facilitates enclosure of the substrate and that can also provide further useful functions.

SUMMARY OF THE INVENTION

Thus, in accordance with one aspect of the present invention, there is provided an arrangement for enclosing an elongate substrate, comprising an outer resilient sleeve held in a radially-expanded configuration by being mounted on an inner holdout member, wherein the holdout member comprises a generally tubular member that has a slit extending longitudinally thereof such that application of a force radially thereof causes the holdout member to reduce in circumference and to collapse around the substrate under the action of the recovery force of the outer resilient sleeve.

In contrast with the known arrangements, therefore, the enclosing arrangement of the present invention is such that the holdout member is not discarded, but remains in place around the substrate, and does so in its integral state. In this manner, the rigidity of the holdout member can be selected to provide mechanical protection for the substrate. Furthermore, by appropriate selection of the electrical properties of the holdout member, it can also perform an electrical function if required.

A substrate is usually regarded as being elongate if its longitudinal dimension exceeds its lateral dimension, but this need not necessarily be the case.

It will be appreciated that in collapsing around the substrate, it will depend on the size of the substrate and the rigidity of the holdout member as to whether or not contact is made between the holdout member and the substrate. In some applications it is preferred to arrange for such contact to be made.

Preferably, the radial force causes one edge of the slit to slide beneath the other edge, thereby to allow the holdout member to curl upon itself.

Arrangements of the invention are thus capable of a large amount of range-taking, that is to say, of being usable with substrates of a large range of lateral dimensions, usually diameters.

The holdout member may be cylindrical, and especially right cylindrical, but it is envisaged that it may have a polygonal cross section.

Preferably, the longitudinal slit of the holdout member extends along the entire length thereof, preferably substantially axially thereof., and may extend radially completely through the wall thereof. Alternatively, the slit may define a weakened line of the holdout member, which is broken or displaced when it is required to collapse the arrangement, for example to bring it into conformity with the substrate.

The holdout member may have two or more slits so as to allow the collapsing, preferably curling, around the substrate, and one or more of the slits may act as a hinge. In one embodiment, the member has three slits, one of which may be arranged to sever such that one edge of the member can curl beneath another edge thereof. The slit that is arranged to sever may alternatively be completely severed initially and may be temporarily held together by a bridging member of flexible material, for example an adhesive tape.

An insert may be provided in the slit that is arranged to allow the collapsing, as opposed to the hinging, action of the holdout member, the insert being secured to one of the edges of the slit and being arranged to deflect the other edge, preferably under the first, to effect the collapse of the holdout member.

The collapsing of the holdout member may be facilitated by the slit being arranged at an angle that is inclined to a radius of the holdout member.

In preferred embodiments, safety features are preferably included, substantially to prevent premature collapses of the holdout member. In some instances, it is therefore desirable to provide temporary retaining means for the holdout member so as to prevent its premature collapse, during storage or transport, for example. Such retaining means may comprise a pin secured through an overlap of the slit tube, or an insert at one or both ends of the tube. Removal of the retaining means may then be arranged to cause collapse of the tube under the action of the recovery force of the resilient sleeve, or may allow collapse upon application of an external radial force. In another embodiment, the insert may be of noncircular, for example oval, shape inside a circular holdout, whereby rotation of the insert may cause or allow collapsing of the holdout.

In one embodiment where an insert is used, a retaining member in the form of a safety rail is used shaped to cooperate with the insert, so that when the safety rail is in place, it substantially prevents deflection of the edges of the holdout tube over each other, and thereby substantially prevents premature collapse of the holdout member. In another embodiment where an insert is used, a removable member is included which, when in place, changes the shape of the insert, substantially to prevent deflection of the edges of the holdout member over each other, and thereby substantially to prevent premature collapse of the holdout member.

It may be desirable for the elastomeric sleeve to extend beyond the ends of the holdout member after collapsing around the substrate, and for such an arrangement, the ends of the resilient sleeve are folded, or rolled, back onto itself. In this way, the entire length of the sleeve can initially be heldout. Particularly when the ends are folded rather than rolled back, it may be desirable to provide friction-reducing means so as to facilitate subsequent folding over onto the substrate. The friction-reducing means may comprise grease, or other lubricant, that is substantially not absorbed by the sleeve, or one or more O-rings disposed within the fold. Alternatively, an insert may be positioned within each fold, which insert is tapered on its outer surface downwards towards the adjacent end of the holdout member. In another embodiment, the resilient sleeve may comprise a revolvable sleeve, being a dual-wall sleeve having a lubricant sealed therewithin. Such a revolvable sleeve is disclosed in EP-A-0 210 807 and is available from Raychem under its trademark RAYVOLVE.

For ease of recovery of the arrangement around the substrate, for example when the substrate is relatively long, the holdout member may be provided in two, or more, longitudinally adjacent portions. Alternatively, the said holdout member of the arrangement may be complemented by a holdout member of different configuration, comprising an annular ring for example that is not collapsible. In a preferred embodiment, the said holdout member is disposed intermediate two fixed annular rings. Recovery of the said holdout member is effected by the radial force, causing the intermediate portion of the arrangement to recover around the substrate, and the end annular holdouts can then be removed, this being facilitated by the tendency of the collapsed intermediate portion of the resilient sleeve to eject the annular rings.

The arrangement may comprise two, or more, resilient sleeves, for example if the substrate is relatively long. The sleeves may be longitudinally adjacent each other, or they may overlap on the holdout member(s).

The holdout member is preferably made of a polymeric material, PVC or ABS for example, and may be supplied with a metallic coating, which may be provided as a separate or integral layer, to prevent transmission of moisture vapour therethrough. In the latter embodiment, the layer should be thin enough so as substantially not to hinder collapsing of the tube. Alternatively, the holdout member may be made substantially entirely from metal, e.g. pressed steel.

The resilient sleeve is preferably made from an elastomeric material.

It is envisaged that the force needed to collapse the arrangement need be no more than can be applied manually.

It will be appreciated that any one embodiment of an arrangement in accordance with the present invention may comprise some or all of the foregoing features.

In a typical application of the arrangement to a cable joint, it is advantageous if the extent of recovery, or shrinkage, is by a factor of at least 3, and preferably 4. However, the minimum inside lateral dimension, for example diameter, of the arrangement should be such as to pass as a clearance fit over the substrate whilst allowing for space for the holdout member to collapse, for example for one edge to curl under the other. In some instances, as when the arrangement is to be applied around a cable joint for example, the internal lateral dimension may need to be larger than merely a clearance fit around the final substrate. In this example, the arrangement will need to be temporarily stored, or parked, to one side of its final position not only around the cable but also around other components that are needed for forming the joint, such as tubular layers of insulating and electrical stress control material. Such other components may themselves be recoverable, for example shrinkable, so that the arrangement of the invention would need to have an expanded size so as to fit over these components in their unrecovered configuration.

Some cable joints are asymmetric, i.e. the electrical connection between the inner electrical conductors is not located centrally between the cut-back ends of the cable jackets. This is normally so that the joint sleeve may be parked on one side of the joint while the electrical connection is made (e.g. by crimping). For such cable joints, the arrangement according to the invention preferably includes a support member which may be placed inside the holdout member, adjacent to the electrical connection, to ensure that when the holdout member is collapsed, it has substantially uniform radial dimensions (e.g. a substantially uniform diameter) along its length. The support member is preferably generally cylindrical in shape. Preferably the support member is longitudinally split, so that it may be placed around a cable without having to thread an end of the cable through an aperture in it. The support member is preferably flexible, and is preferably formed from a polymeric material, e.g. natural or synthetic rubber. Most preferably, the material is a foamed polymeric material.

In a further aspect, the present invention provides a method of enclosing an elongate substrate, wherein an arrangement comprising an inner holdout member that holds an outer resilient sleeve thereon in a radially-expanded configuration is disposed over the substrate, the holdout member comprising a generally tubular member that has a slit extending longitudinally thereof, and wherein a force is applied radially of the holdout so as to cause the holdout to reduce in circumference and to collapse around the substrate under the action of the recovery force of the outer resilient sleeve.

The resilient sleeve may be longer than the holdout member and be folded back thereto, subsequent to collapsing of the holdout member, the ends of the sleeve may then be unfolded on to the substrate, and may be environmentally sealed thereto.

Preferably, the arrangement employed in the method is in accordance with said one aspect of the invention.

BRIEF DESCRIPTION OF THE DRAWINGS

Arrangements for and methods of enclosing a substrate will now be described, by way of example, with reference to the accompanying drawings, in which:

FIG. 1 is a longitudinal section through a first embodiment of the arrangement in its expanded configuration;

FIG. 2 is an end view of the arrangement of FIG. 1;

FIG. 3 is an end view of the arrangement of FIG. 2 in its collapsed form;

FIG. 4 is a schematic section through the arrangement of FIG. 1 collapsed on to a power cable joint;

FIG. 5b is an enlarged view of part of the holdout member of FIG. 5a;

FIGS. 7 & 8 are end views of a third embodiment of the holdout member of the arrangement;

FIG. 9 is a modification of the embodiment of FIGS. 7 and 8;

FIG. 10 is a section through a fourth embodiment of the arrangement;

FIG. 23 shows an asymmetric cable joint which is to be enclosed by an arrangement according to the invention, the arrangement including a support member positioned adjacent to the electrical connection inside the holdout member.

DETAILED DESCRIPTION OF THE INVENTION

Figure 5A:
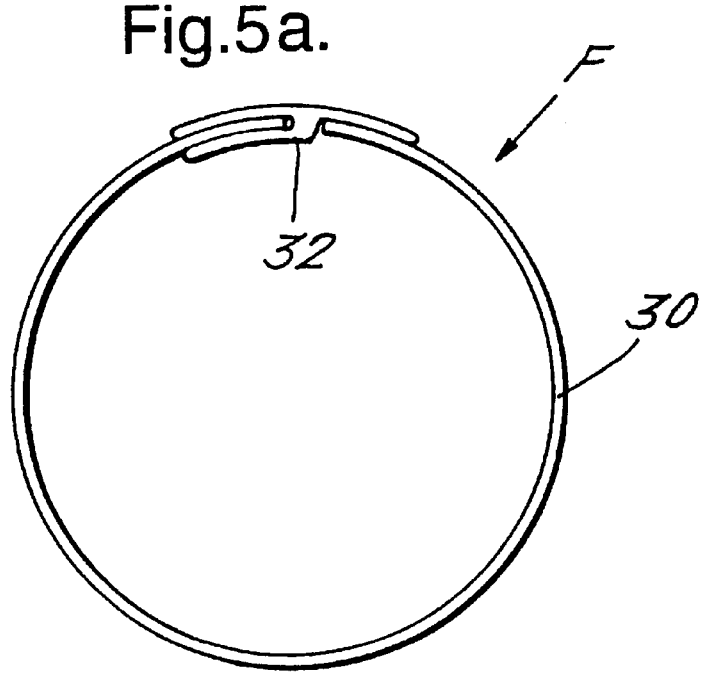
FIG. 5a is an end view of a second embodiment of the holdout member of the arrangement.

Referring to FIGS. 1 to 3, the arrangement for producing an outer enclosure of a cable joint 2 comprises an outer elastomeric cylindrical tubular sleeve 4 that is held in a radially stretched condition so as to be three times its relaxed diameter by being mounted on a polymeric cylindrical tubular holdout member 6. The holdout 6 has a longitudinal slit 8 extending along its whole length parallel to its axis. The slit 8 is cut completely through the holdout wall radially at an angle to the axis of the holdout 6, as can be seen in FIG. 2. The sleeve 4 is longer than the holdout 6, and as can be seen in FIG. 1, the sleeve ends 10 are folded back such that the entire length of the sleeve is supported by the holdout 6. The arrangement 2 is mounted as a clearance fit over a generally cylindrical substrate 14.

To collapse the arrangement 2 onto the substrate, a force F is applied generally radially inwards adjacent the tube slit 8 so as to cause the slit edges to slide over one another such that the holdout 6 curls onto itself in an overlapping manner as can be seen in FIG. 3. Upon disengagement of the edges of the slit 8, the forces within the sleeve 4 tending to cause it to recover to its unstretched diameter will themselves act to drive the holdout 6 around the substrate 14 until it is in contact therewith. It will be appreciated that in this embodiment, the rigidity of the holdout 6 is such that the shrinking sleeve 4 can drive it down on to the substrate 14.

FIG. 4 shows the arrangement 2 after it has been recovered around a joint between two electric power cables 18. The cable joint is shown schematically, with the holdout 6 collapsed onto the inner joint region 20 that extends over the cable screens 22. The ends 10 of the elastomeric sleeve 4 have been folded over and down onto the jackets of respective cables 18 so as to form an environmental seal therewith. In the latter respect, a strip of pressure sensitive adhesive or mastic may be interposed between the sleeve ends 10 and the cable jackets.

Figure 5B:
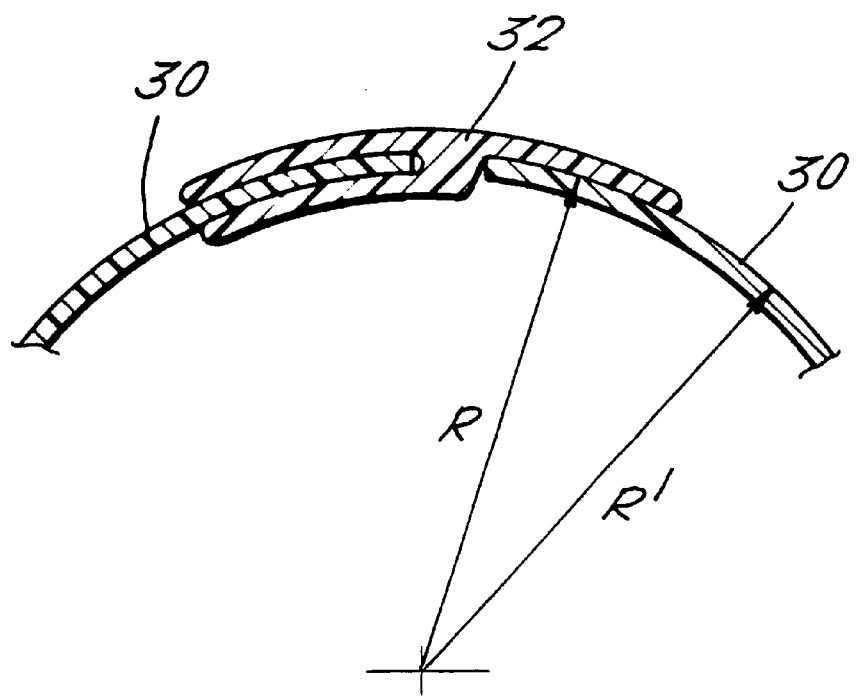

Referring to FIG. 5a, there is shown one embodiment of a holdout member 30 in which an insert 32 is provided in the slit of the tube. The insert 32 is of generally h configuration, with one edge of the tube 30 retained therein. FIG. 5b shows an enlargement of the holdout of FIG. 5a in the region of the insert 32. In order to facilitate collapse of the holdout 30, the inner radius R of the insert 32 abutting the outer surface of the holdout 30, as shown, is preferably less than the outer radius R' of the abutting holdout surface. In this manner, the insert 32 tends to urge the abutting edge of the holdout 30 inwards so as to bias it to curl under the opposing retained holdout edge upon application of the collapsing force F.

Figure 6A:
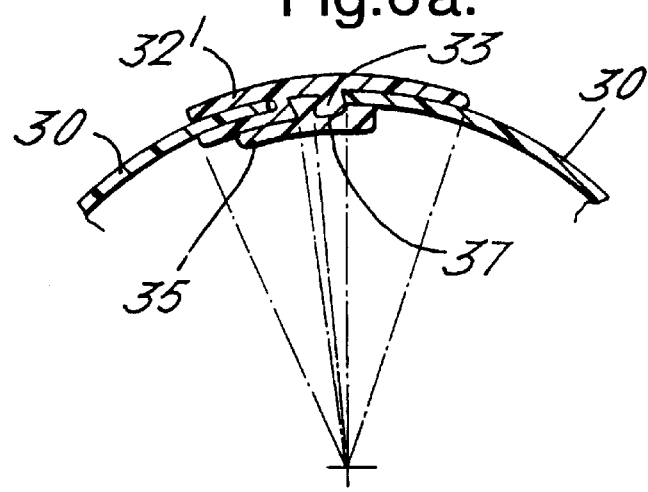
FIGS. 6a & 6b are cross-sectional views showing alternative arrangements of safety features for preventing premature installation of the holdout member of FIGS. 5a and 5b.
Figure 6B:
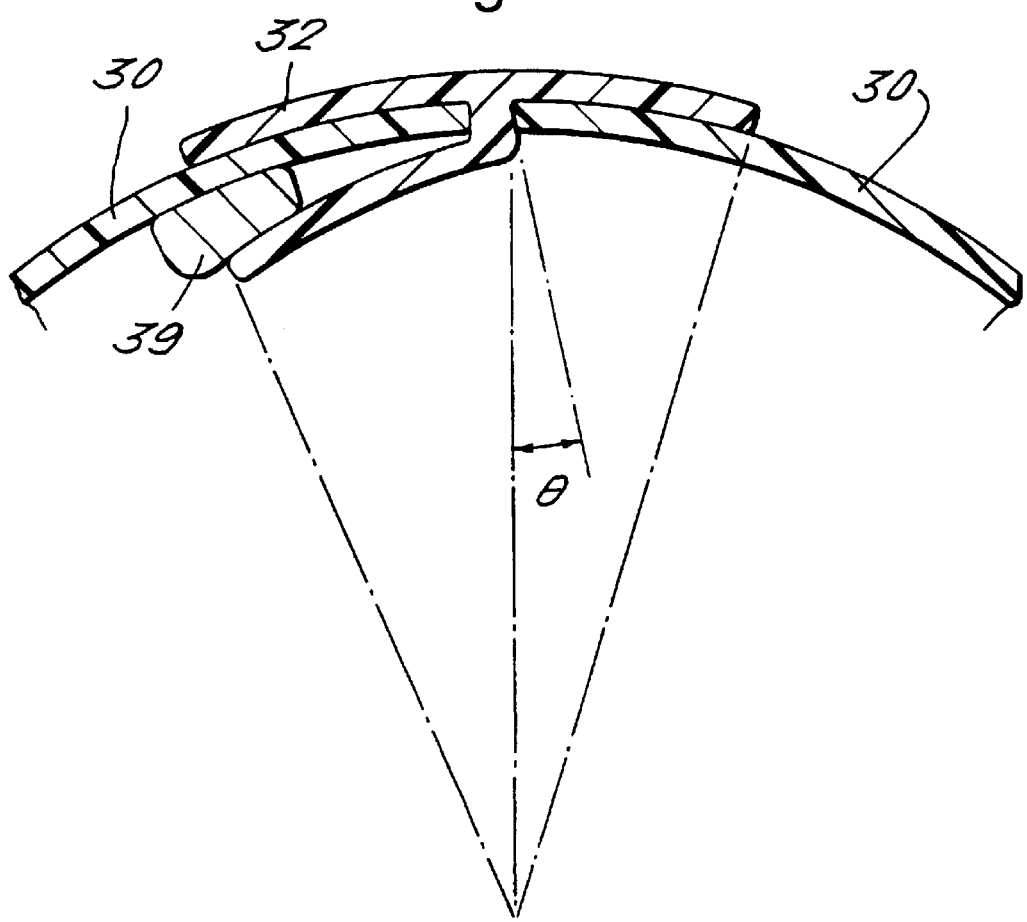

FIGS. 6a and 6b show modifications to the embodiment of FIGS. 5a and 5b, in which retaining members are used to prevent premature installation of the held-out sleeve, both in storage and on site prior to application of the collapsing force F.

In FIG. 6a, a safety rail 35 is used in conjunction with the holdout tube 30 and h-shaped insert (now referenced 32'). The h-shaped insert 32' has a modified shape, having an inwardly directed ridge 33, extending from the upper part of the stem of the "h". A retaining member comprising a cooperating safety rail 35 comprises a channel shaped region 37, which can be slid longitudinally over the ridge 33 of the h-shaped insert 32'. The safety rail 35 is installed by sliding it into cooperation with the h-shaped insert 32. Once the safety rail 35 is in place, one abutting edge of the holdout tube 30 is held substantially flush against the inwardly directed surface of the stem of the h-shaped insert 32', substantially preventing it from curling under the other abutting edge of the holdout tube 30. When installation is required, the safety rail 35 is removed by sliding it out. Application of the collapsing force F then causes the abutting edges of the hold out tube 30 to curl over each other, as before.

FIG. 6b shows an alternative safety feature for preventing premature installation. In this embodiment, a retaining member in the form of a wedge 39 is included, positioned between the inwardly directed leg of the h-shaped insert 10 and the inner surface of the edge of the hold out tube 10. This increases the angle θ of the insert 32 (see drawing), and hence makes it significantly harder for the abutting edges of the hold-out 30 to curl over each other. The wedge 39 is left in place during storage, and on site prior to installation. When installation is required, the wedge 39 is simply removed. This decreases the angle θ of the profile, and the edges 30 can then be made to curl over each other as before, by applying the collapsing force F.

A sector of a further embodiment of holdout 40 is shown in FIGS. 7, 8 and 9. Referring to these figures, the holdout is formed with three adjacent slits 42, 44, 46, each of which extends totally along the length of the holdout 40 but only partway through its wall thickness. The outer slits 42 and 46 are open to the outer surface of the holdout 40, and the intermediate slit 44 is open to the inner surface of the holdout 40. Application of the collapsing force F as shown in FIG. 7, displaces the holdout to the dotted position. Continued application of the force F and/or under the action of the recovery force of the elastomeric sleeve 48 (shown in FIG. 8) results in further collapse of the holdout 40 which snaps at the slit 44 so that adjacent edges of the holdout 40 slide over one another as it curls upon itself. To prevent premature recovery of the holdout 40, an adhesive tape 50 can be applied so as to bridge the intermediate slit 44*a* (FIG. 9), which optionally can then extend completely through the wall of the holdout tube 40. Upon collapsing of the holdout tube 40, the tape is arranged to slip and allow collapse and curling of the holdout 40 onto the enclosed substrate.

FIG. 10 shows a modification of the closure arrangement 56 in which a single elastomeric sleeve 58 is held out in a stretched condition on three holdout members 6 that are placed in longitudinal abutting relationship. The arrangement 56 is particularly useful when the substrate is relatively long, and there could be a danger that if a single holdout member were used then it might be difficult to ensure that it holds out completely along its entire length during storage and/or transport. In application of the arrangement 56 around the substrate, the intermediate holdout 6 would initially be released and caused to collapse before those at each end.

Figure 11:
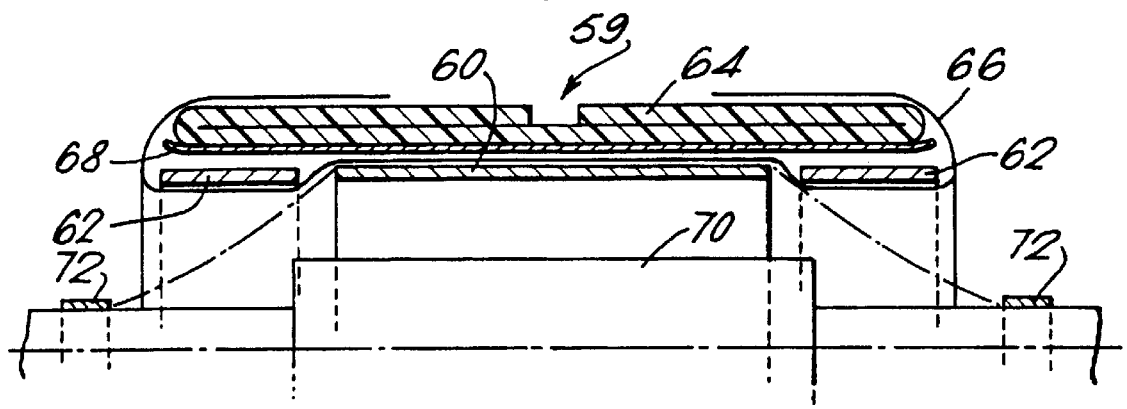
FIGS. 11 to 13 are sections through one half of a fifth embodiment of the arrangement.
Figure 12:
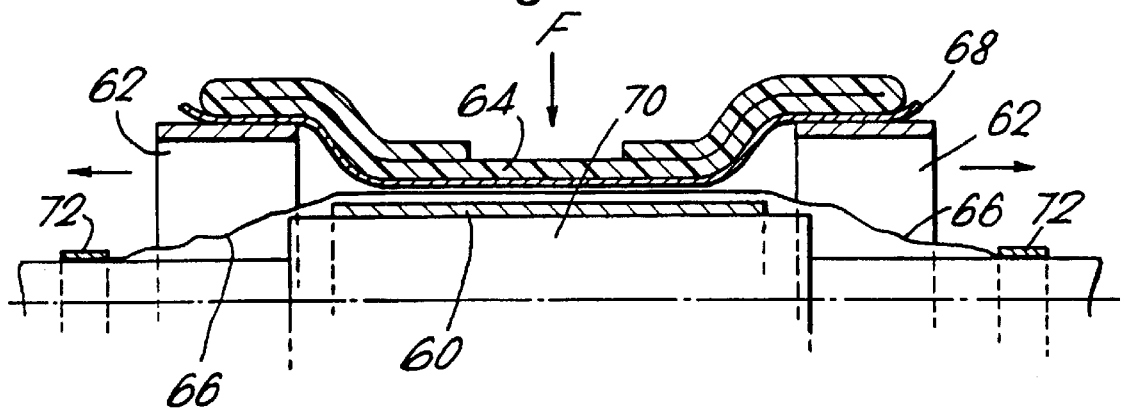
Figure 13:
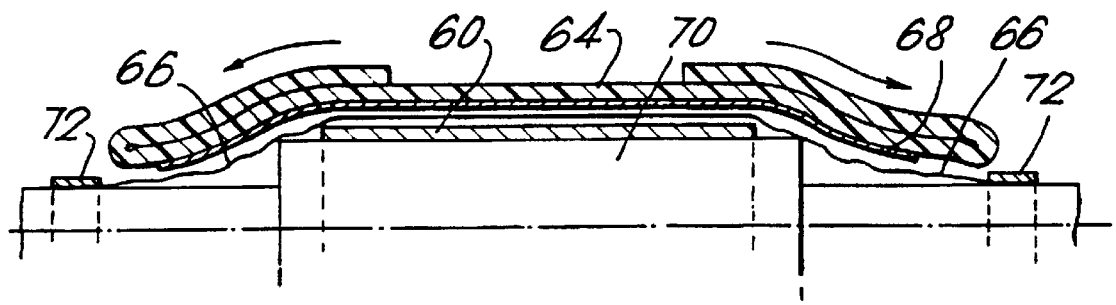

FIGS. 11 to 13 show a further modification of the closure arrangement of the invention. In this arrangement 59, a first holdout 60 is a collapsible holdout of the type already described. Additionally, a solid annular ring 62 of the same diameter as the holdout 60 is located adjacent each end thereof, and an outer elastomeric sleeve 64 is supported in a radially expanded configuration by all three holdouts 60, 62, 62. A copper braid 66, which may be of tubular form, or preferably, comprises one or more strips, is disposed between the intermediate holdout 60 and the resilient sleeve 64 and then passes inside the end holdouts 62 before being bent back over the outside of the folded back ends of the sleeve 64. As shown in FIG. 11, the arrangement also comprises a resilient tubular braid 68 of plastics material that is present so as to facilitate mounting of the stretched sleeve 64 onto the holdouts during manufacturing assembly. The arrangement 59 is shown enclosing a schematic cable joint 70 prior to recovery thereonto. The copper braid 66 is first unfolded and brought into the position shown by the dotted lines and secured at each end by roll spring clamps 72 onto respective cable shields. As a first step in the recovery of the arrangement 59, the force F is applied to the intermediate, collapsible holdout 60 so as to cause it to curl around the joint 70 as shown in FIG. 12. The end fixed annular holdouts 62 may then easily be removed and discarded so as to allow the end portions of the elastomeric sleeve 64 to be unfolded down onto the cable joint 70 and to seal onto respective cable jackets (not shown), as indicated in FIG. 13.

Figure 14:
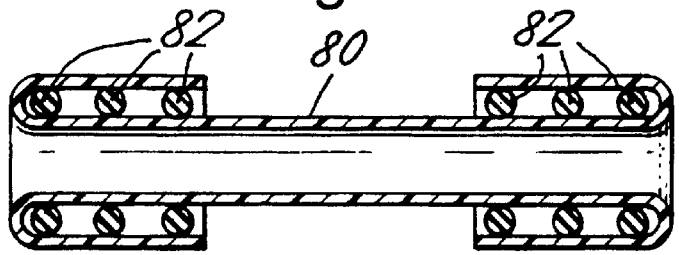
FIGS. 14 to 17 are schematic sections through modifications of the sleeve of the arrangement.
Figure 15:
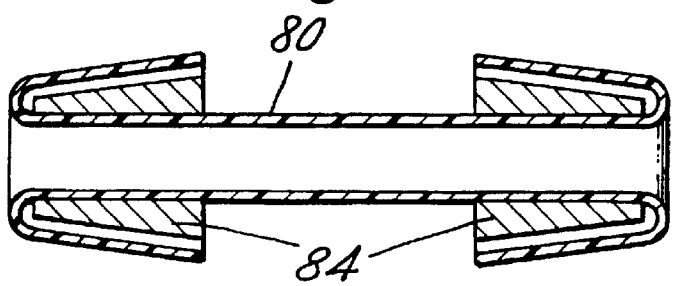

When the ends of the elastomeric sleeve of the arrangement are folded back on themselves, unfolding down onto the substrate may be facilitated by the use of a friction-reducing means. FIG. 14 shows schematically an elastomeric sleeve 80 folded back at its ends, with three O-rings 82 trapped in each of the foldbacks. As an alternative to the O-rings, tapering inserts may be provided in the foldbacks as shown at 84 in FIG. 15. A lubricant, such as a grease may also be applied in the foldback region to facilitate unfolding of the sleeve 80, either as an addition or as an alternative to the features shown in FIG. 14 or FIG. 15.

Figure 16:
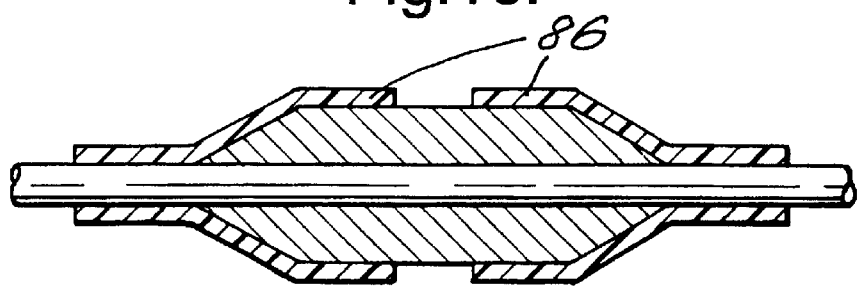
Figure 17:
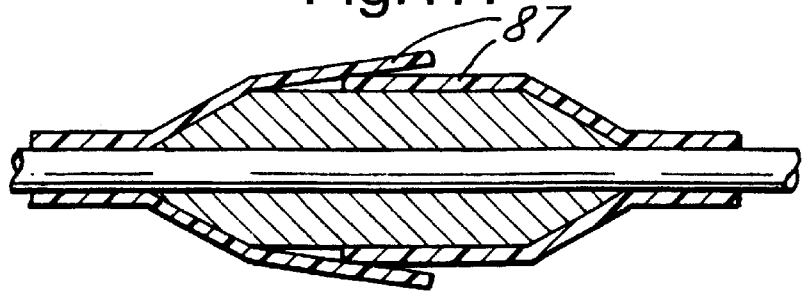

For some applications, the substrate may be so long as to render the use of a single outer elastomeric sleeve impracticable. As shown diagramatically in FIG. 16, a pair of sleeves 86 may then be provided. In a further modification, FIG. 17 shows an installed arrangement in which two sleeves 87 overlap one another in the intermediate region of the holdout member.

Although the elastomeric sleeve of the arrangements described may be a simple single wall sleeve, it is also envisaged that the sleeve or sleeves could be formed as a dual wall sleeve containing an internal lubricant. Such sleeves are sold by Raychem under the trademark RAYVOLVE.

Figure 18:
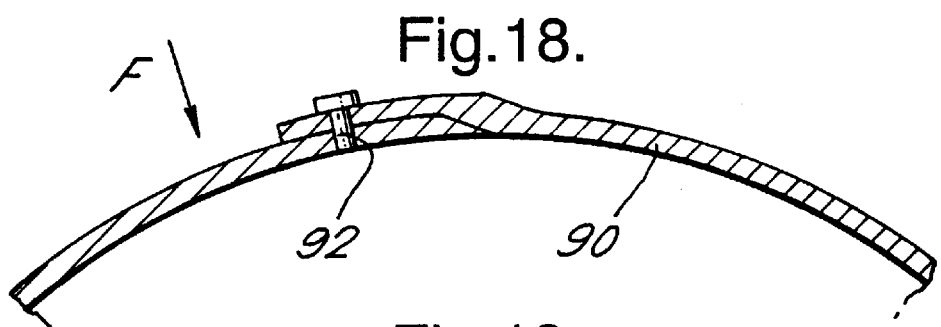
FIG. 18 shows a sector of a further modified holdout of the arrangement.
Figure 19:
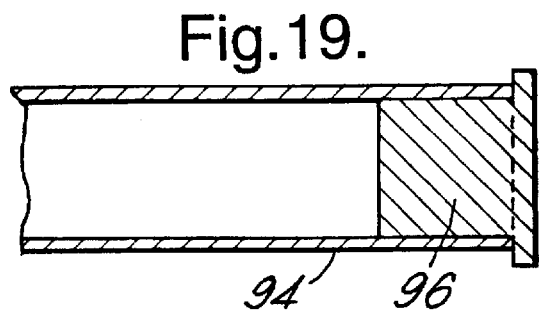
FIG. 19 shows a section of one end of a still further embodiment of the holdout of the arrangement.
Figure 21:
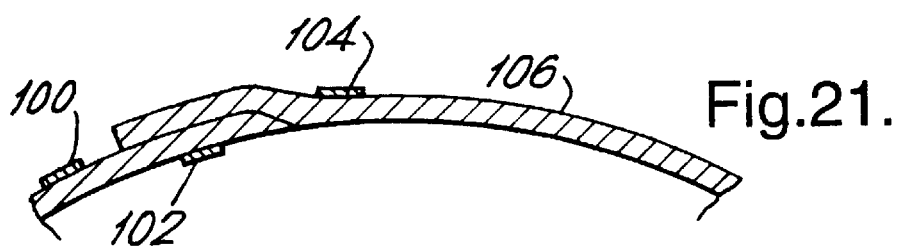
FIG. 21 shows a section through the retaining member of FIG. 20 when mounted on the holdout member of the arrangement.
Figure 20:
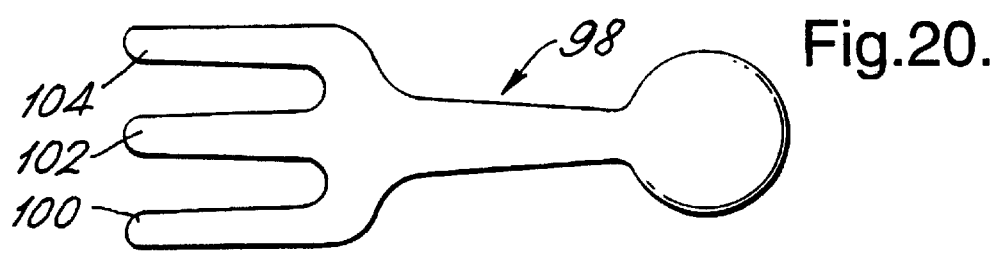
FIG. 20 shows a retaining member for the arrangement.

As mentioned earlier, in some instances it is desirable to have a positive retention of the holdout member in the expanded configuration. FIG. 18 shows one embodiment of an arrangement for achieving this, in which adjacent edges of a holdout member 90 are arranged to overlap in the expanded configuration, and are held in that configuration by a retaining member in the form of a pin 92. The pin 92 may be weak enough so as to be snapped under the action of the recovering force F. Alternatively, the pin 92 may be provided beyond one or each end of the outer resilient sleeve so that it may be easily removed at the time of installation of the arrangement. An alternative temporary holdout mechanism is shown in FIG. 19, in which a collapsible holdout member 94 has a retaining member in the form of a removable bung 96 installed in one or each end thereof. In a still further modification shown in FIG. 20, a retaining member in the form of a fork 98 has three prongs 100, 102, 104 that are arranged to span alternate inner and outer surfaces of a holdout member 106 longitudinally at one or each end thereof.

Figure 22:
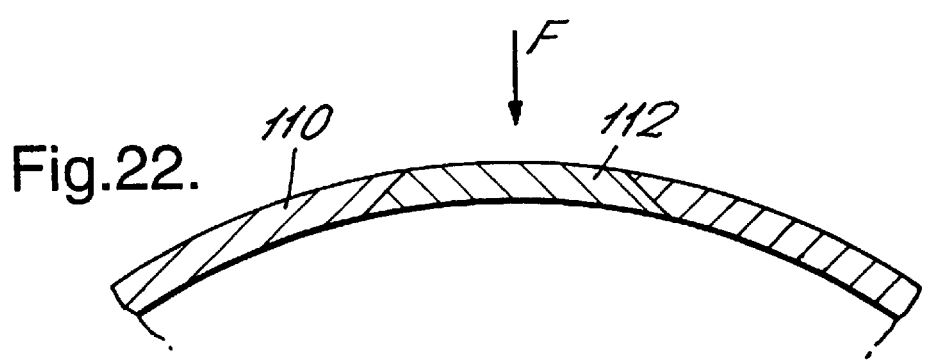
FIG. 22 shows a sector of a still further modified holdout of the arrangement.

In a still further modification of the arrangement, FIG. 22 shows a sector of a holdout member 110 in which an insert or keeper 112 is mounted in the slit thereof so as to extend completely along its longitudinal length. Radially inwards pressure in the region of the insert 112 will dislodge it into the interior of the holdout 110, which will then collapse onto itself as previously described.

FIG. 23 shows an asymmetric cable joint, i.e. a joint in which the electrical connection 114 between the inner electrical conductors 113 is not located centrally between the cut-back ends of the cable jackets 115. In the embodiment shown, the arrangement according to the invention includes a support member 116 which is placed inside the holdout member 30, adjacent to the electrical connection 114, to ensure that when the holdout member is collapsed, it has a substantially uniform diameter along its length. The support member 116 is generally cylindrical in shape (e.g. a tube), and is longitudinally split, so that it may be placed around the cable without having to thread an end of the cable through an aperture in it. The support member is also flexible, and is preferably formed from a polymeric material, e.g. natural or synthetic rubber. Most preferably the material is a foamed polymeric material.

Also shown in FIG. 23 are seals 122 (e.g. mastic or gel sealant) located on the cable jackets 115, for forming seals with the sleeve 64 when the holdout member is collapsed and the sleeve is recovered around the collapsed holdout member and the cut-back cable jacket ends. Cable shield wires 118 which are crimped at 120, are also shown.

In the embodiments of the enclosure arrangement of the invention, it is envisaged that the force F required to effect its collapse is such that it can be provided by a human hand.

It is to be understood that in any one arrangement in accordance with the present invention any or all of the features disclosed in the embodiments above may be combined as appropriate.

What is claimed is:

1. An arrangement for enclosing an elongate substrate, comprising an outer elastomeric sleeve held in a radially-expanded configuration by being mounted on an inner holdout member, wherein the holdout member comprises a generally tubular member that has a slit extending longitudinally thereof such that application of a force radially thereof causes the holdout member to reduce in circumference and to collapse around the substrate under the action of a recovery force of the outer elastometric sleeve.

2. An arrangement according to claim 1, wherein the radial force causes one edge of the slit to slide beneath the other edge, thereby to allow the holdout member to curl upon itself.

3. An arrangement according to claim 1, wherein the longitudinal slit of the holdout member extends along the entire length thereof.

4. An arrangement according to claim 1, wherein the longitudinal slit of the holdout member extends radially completely through the wall thereof.

5. An arrangement according to claim 1, wherein the holdout member has at least two of said slits.

6. An arrangement according to claim 1, wherein an insert is provided in the slit of the holdout member, the insert being secured to one edge of the slit and overlapping another edge of the slit.

7. An arrangement according to claim 1 wherein the edges of the slit abut one another.

8. An arrangement according to claim 1, wherein the ends of the resilient sleeve are folded back onto itself.

9. An arrangement according to claim 8, comprising friction-reducing means at each foldback end of the sleeve to facilitate folding over of the sleeve ends subsequent to collapse of the holdout member.

10. An arrangement according to claim 9, wherein the resilient sleeve comprises a revolvable sleeve, and the friction-reducing means comprises a lubricant sealed therewithin.

11. An arrangement according to claim 9, wherein the friction-reducing means comprises at least one O-ring.

12. An arrangement according to claim 1 further comprising a second holdout member longitudinally aligned with the first holdout member, wherein the elastomeric sleeve is held out on said second longitudinally aligned holdout member.

13. An arrangement according to claim 12, further comprising a third holdout member longitudinally aligned with said holdout member and said second holdout member, wherein an intermediate one of which comprises the first holdout member, and the longitudinally aligned outermost holdout members comprise annular rings.

14. An arrangement according to claim 1, comprising a friction-reducing layer between the elastomeric sleeve and the holdout member.

15. An arrangement according to claim 1, wherein at least two of said elastomeric sleeves are supported on said holdout member.

16. An arrangement according to claim 15, wherein the sleeves overlap each other.

17. An arrangement according to claim 1, comprising a flexible electrically-conductive member disposed between said outer elastomeric sleeve and said holdout member, for making electrical contact with the substrate upon removal of said holdout member.

18. An arrangement according to claim 1 being an enclosure for a cable splice.

19. An arrangement according to claim 1, which is suitable for enclosing an asymmetric cable joint, wherein the arrangement further comprises a support member positioned inside the holdout member, adjacent to an electrical connection, to ensure that when the holdout member is collapsed, it has substantially uniform radial dimensions along its length.

20. An arrangement according to claim 1, wherein the elongate substrate is a cable joint or termination.

21. An arrangement for enclosing an elongate structure comprising an outer resilient sleeve held in a radially-expanded configuration by being mounted on an inner holdout member wherein the holdout member comprises a generally tubular member that has at least three slits, at least one of said slits extending only partially through the wall thereof to provide a hinge to allow collapsing of the holdout member upon application of a force radially thereof.

22. An arrangement according to claim 12, wherein two of the at least three slits extend only partially through the wall thereof, and the third slit is bridged by a flexible member temporarily secured thereto.

23. An arrangement for enclosing an elongate substrate comprising:
    an outer resilient sleeve held in a radially expanded configuration by being mounted on an inner holdout member;
    wherein the ends of the resilient sleeve are folded back onto the resilient sleeve;
    friction reducing means at each foldback end of the resilient sleeve to facilitate folding over of the sleeve ends subsequent to collapse of the holdout member;
    wherein the holdout member comprises a generally tubular member that has a slit extending longitudinally thereof, such that application of a force radially thereof causes the holdout member to reduce in circumference and to collapse around a substrate under the action of a recovery force of the outer resilient sleeve, and
    wherein the friction-reducing means comprises an insert located beneath each foldedback sleeve end, the insert being tapered so as to direct the folded back sleeve end down onto the substrate.

24. An arrangement for enclosing an elongate substrate, comprising:
    an outer resilient sleeve held in a radially-expanded configuration by being mounted on an inner holdout member, wherein the holdout member comprises a generally tubular member that has a slit extending longitudinally thereof such that application of a force radially thereof causes the holdout member to reduce in circumference and to collapse around the substrate under the action of a recovery force of the outer resilient sleeve;

an insert provided in the slit of said holdout member, the insert being secured to one edge of the slit and overlapping another edge of the slit; and a retaining member mounted on the holdout member, whereby removal of the retaining member causes or allows the holdout member to collapse.

25. An arrangement according to claim 24, wherein the retaining member comprises a removable safety rail, which is shaped to cooperate with the insert, so that, when in place, it substantially prevents collapse of the hold out member.

26. An arrangement according to claim 24, wherein the retaining member comprises a removable additional member which, when in place, changes the shape of the insert, substantially to prevent collapse of the hold out member.

27. A method of enclosing an elongate substrate, wherein an arrangement comprising an inner holdout member that holds an outer resilient sleeve thereon in a radially-expanded configuration is disposed over the substrate, the holdout member comprising a generally tubular member that has a slit extending longitudinally thereof, and wherein a force is applied radially of the holdout so as to cause the holdout to reduce in circumference and to collapse around the substrate under the action of a recovery force of the outer elastomeric sleeve.

\* \* \* \* \*